(No Model.) 2 Sheets—Sheet 1.
D. H. BURRELL.
CHEESE AND CREAMERY VAT.
No. 433,197. Patented July 29, 1890.
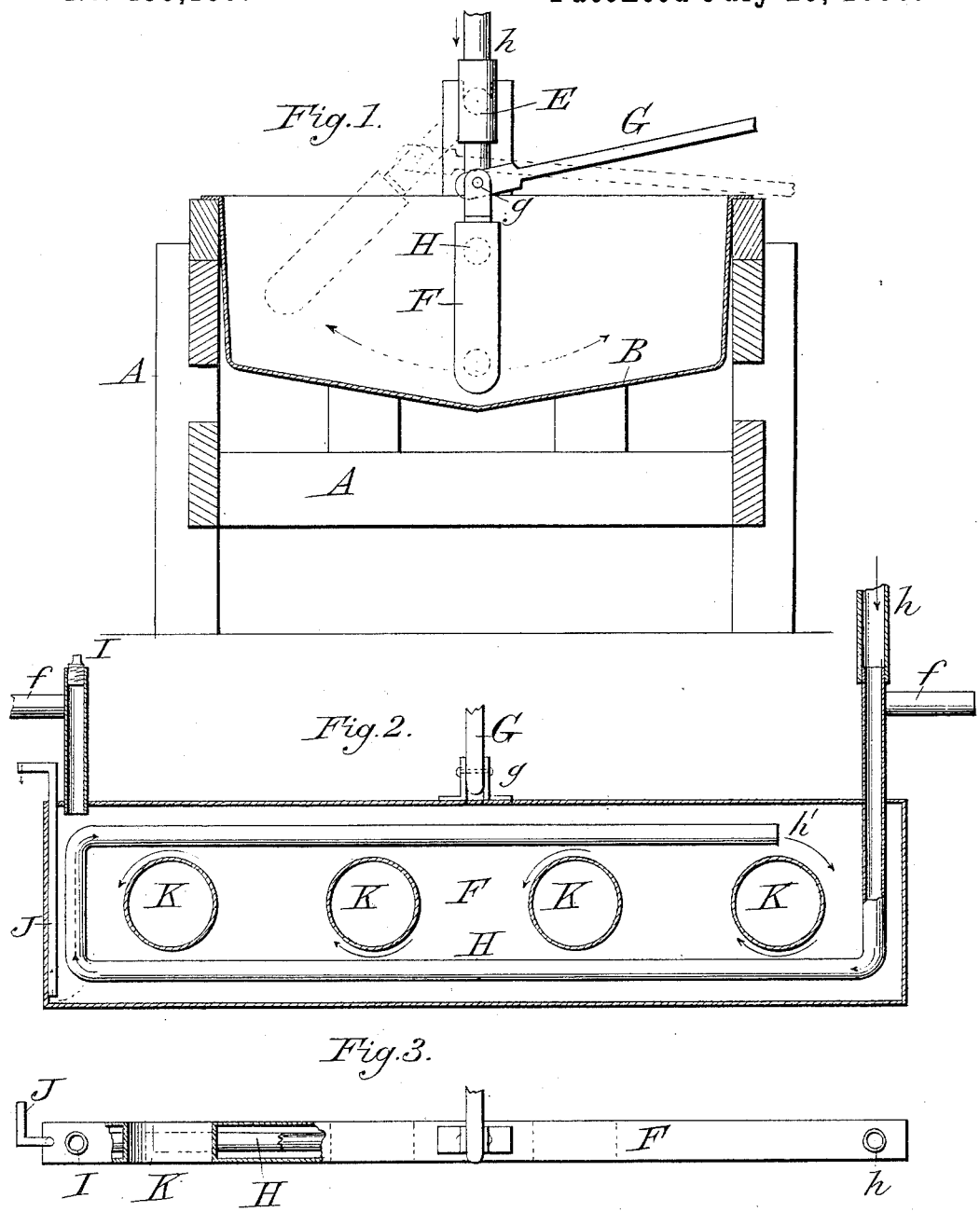
Attest:
H. H. Schott
A. R. Brown
Inventor:
David H. Burrell
by J. C. Taskerwalty (No Model.) 2 Sheets—Sheet 2.

D. H. BURRELL.
CHEESE AND CREAMERY VAT.

No. 433,197. Patented July 29, 1890.

Attest:
F. H. Schott.
A. R. Brown.

Inventor:
David H. Burrell,
per J. C. Tasker atty.

UNITED STATES PATENT OFFICE.

DAVID H. BURRELL, OF LITTLE FALLS, NEW YORK.

CHEESE AND CREAMERY VAT.

SPECIFICATION forming part of Letters Patent No. 433,197, dated July 29, 1880.

Application filed November 30, 1880. Serial No. 21,397. (No model.)

*To all whom it may concern:*

Be it known that I, DAVID H. BURRELL, a citizen of the United States, residing at Little Falls, in the county of Herkimer and State of New York, have invented certain new and useful Improvements in Cheese and Creamery Vats; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to vats adapted to setting milk for the purpose of raising cream, also for the purpose of making cheese; and it consists of a vat mounted in a suitable framework, a swinging radiator having openings to allow a free passage of the milk during its oscillations, a pipe-coil, and a small pipe extending from near the bottom of the radiator to the outside of the vat to hold the steam within the radiator and afford an exit for the condensed steam, and pipes having journals which enter bearings upon the frame, and by means of which the radiator is oscillated, as will be hereinafter described and claimed.

Figures 4, 5:
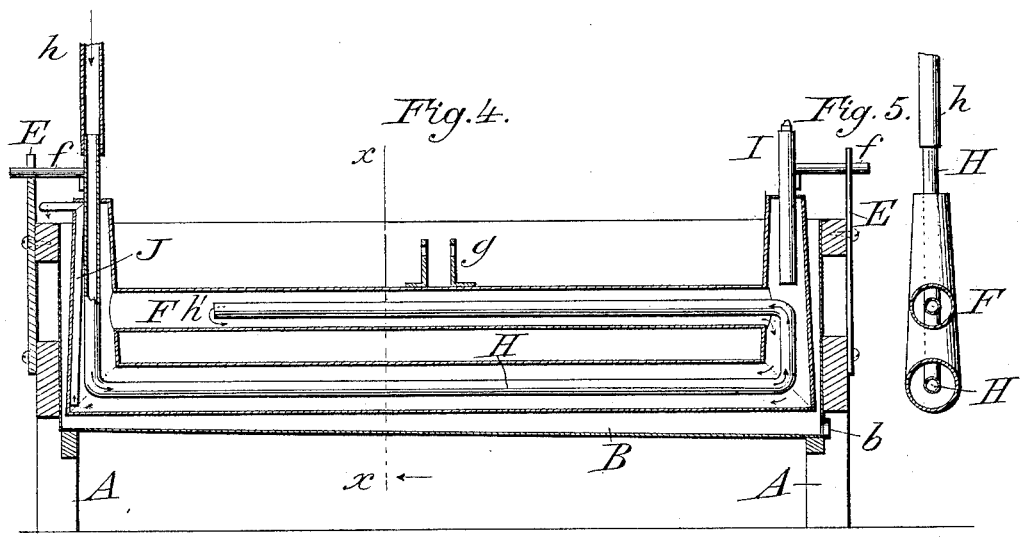
Figure 6:
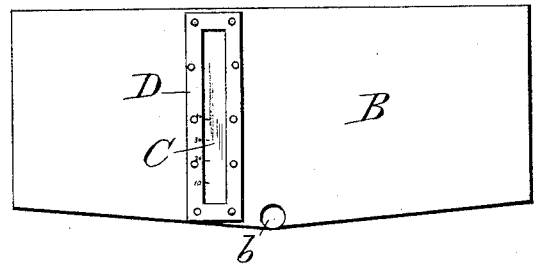
Figure 7:
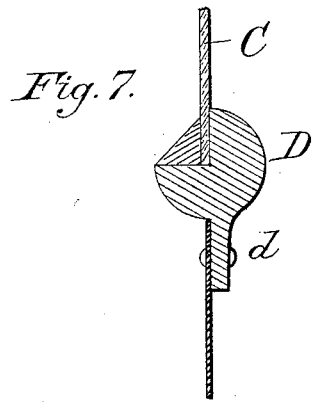

In the drawings, Figure 1 is a transverse section of a vat, showing the swinging radiator and connecting-rod. Fig. 2 is a longitudinal section of a swinging radiator, showing the interior arrangement; Fig. 3, a plan of same; Fig. 4, a longitudinal section of a vat with swinging radiator, showing a modification of what is shown in Figs. 1 and 2. Fig. 5 is a cross-section of the radiator on line $x\ x$ of Fig. 4. Fig. 6 is an end view of the vat removed from the frame, showing the transparent pane; Fig. 7, an enlarged detail view showing the manner of inserting and securing the transparent pane to the vat.

A A represents the wooden frame supporting the tin vat B. The interior of this vat or receptacle is of the usual form, and provided with the outlet $b$. Located preferably near the outlet $b$ is the transparent section C, extending from near the top to the bottom of the vat. This is for the purpose of ascertaining the quantity or condition of the contents. By reference to Figs. 6 and 7 it will be seen that this union is effected in the following manner: The frame D is made preferably of malleable iron, which is well tinned over its entire surface. The tin-plate is then riveted to the frame, as shown in Fig. 7 at $d$, and finally well soldered, the preparatory tinning of the frame making this entirely feasible. The malleable-iron frame is made of sufficient strength to compensate for the opening for the insertion of the glass. By this means I am enabled to have a clear, vertical, transparent column, which I use as a measure of quantity. On the glass are marks which are indexed by ten gallons. This is of much importance, as by close observance exactly the quantity of milk can be put in to make a given number of equal-sized cheeses, and also in milk-setting by the extended column the demarkation of the milk and cream can be seen at any elevation. This is also very important, as in operating these vats sometimes they are but half or even quarter full.

E E are bearings attached to the center of the ends of the frame A. These may be made vertically adjustable, but during operation are secured rigid. These bearings are for the reception of the journals of the swinging radiator. It is to the construction of this radiator that my improvement especially refers.

F is the swinging radiator provided with the journals $f\ f$, and intended to oscillate in the bearings E E. Somewhat below these journals $f\ f$ the connecting-rod G is attached loosely at $g$. This is for imparting the swinging movement from any operative mechanism. This radiator has two distinct functions—viz., either to raise or lower the temperature of the contents. For milk-setting, to raise the cream necessitates in warm weather a lower temperature, and in making cheese a higher temperature. These changes are effected by the agency or aid of cold water or steam, respectively. When for raising cream, cold water is forced into the induct at $h$ and along through the coil H until it finds its exit into the radiator at $h'$, which fills up, and a current is forced in the direction of the arrows, and finally escapes through the opening I, the plug being removed and a hose attached, (the small pipe J being plugged.) By this arrangement I maintain an even temperature throughout the radiator. In cheese-making the contents have to be heated. Steam is admitted at the induct $h$, and passes along the coil H to its exit $h'$ into the radiator, which fills up the cavity. The opening I in this case is plugged, as shown. As the steam condenses, water accumulates at the bottom of the radiator.

J is a small pipe extending from near the bottom of radiator to outside of vat. This is for the double purpose of holding the steam within the radiator and as a means of exit for the condensed steam, (water.) The pressure of the steam will force the water out of the radiator, up the pipe J, and outside the vat. By this arrangement, also, I effect an even rise of temperature throughout. The circular openings K are to allow a free passage for the milk during the oscillations of the radiator.

A modification of the preceding is shown at Fig. 4, in which the radiator is in the form of a coil. The internal arrangement, however, is the same as before described.

The advantages to be derived from these improvements over others in present use are—viz: By the means of producing an even refrigeration the contents are more evenly and quickly cooled, and vice versa in heating, and when changing from water to steam the first effect of the steam is to expel the water after the plug has been removed from the small pipe J and the water-outlet has been closed.

It is obvious that in using this apparatus any suitable cooling or heating medium may be employed. In setting milk for cream its temperature is rapidly lowered by passing cold water through the radiator, and when the vat is used for cheese-making the temperature of the curd is readily raised to the required degree by the passage through the radiator of either hot water or steam.

Having thus described my invention, what I claim as new, and desire to secure by Letters Patent, is—

The combination of the frame A, having bearings E E, the vat B, having an outlet $b$, the swinging radiator F, having openings K, coil H, bent, as shown, and pipe J, and the pipes I I, having journals $f$, all substantially as shown and described.

In testimony whereof I affix my signature in presence of two witnesses.

DAVID H. BURRELL.

Witnesses:
    WATTS T. LOOMIS,
    MERRICK FREEMAN.